United States Patent [19]

Palmer

[11] Patent Number: 5,606,114
[45] Date of Patent: Feb. 25, 1997

[54] BATTERY LEAK TESTING APPARATUS

[75] Inventor: William P. Palmer, Anderson, Ind.

[73] Assignee: General Motors Corporation, Detroit, Mich.

[21] Appl. No.: 574,084

[22] Filed: Dec. 18, 1995

[51] Int. Cl.$^6$ ............................................ G01M 3/16
[52] U.S. Cl. .................................... 73/49.3; 429/57
[58] Field of Search ............................ 73/49.3, 52, 41, 73/49.2, 40, 40.7; 429/90, 87, 57

[56] References Cited

U.S. PATENT DOCUMENTS 3,529,463  9/1970  Orlando et al. ...................... 73/49.2 R
3,793,876  2/1974  Oswald ................................ 73/49.2 R

*Primary Examiner*—Hezron E. Williams
*Assistant Examiner*—Jay L. Politzer
*Attorney, Agent, or Firm*—Lawrence B. Plant

[57] ABSTRACT

Apparatus for detecting leaks in hydrogen-generating electric storage batteries including suitable enclosure for the battery, means for overcharging the battery to generate hydrogen pressure therein, and a sensor for detecting the presence of hydrogen in the enclosure. The battery's vent will be suitably plugged or routed to divert any hydrogen escaping through the vent from contaminating the air in the enclosure. A hydrogen accumulator/separator attached to the enclosure concentrates the hydrogen at the hydrogen sensor.

6 Claims, 3 Drawing Sheets

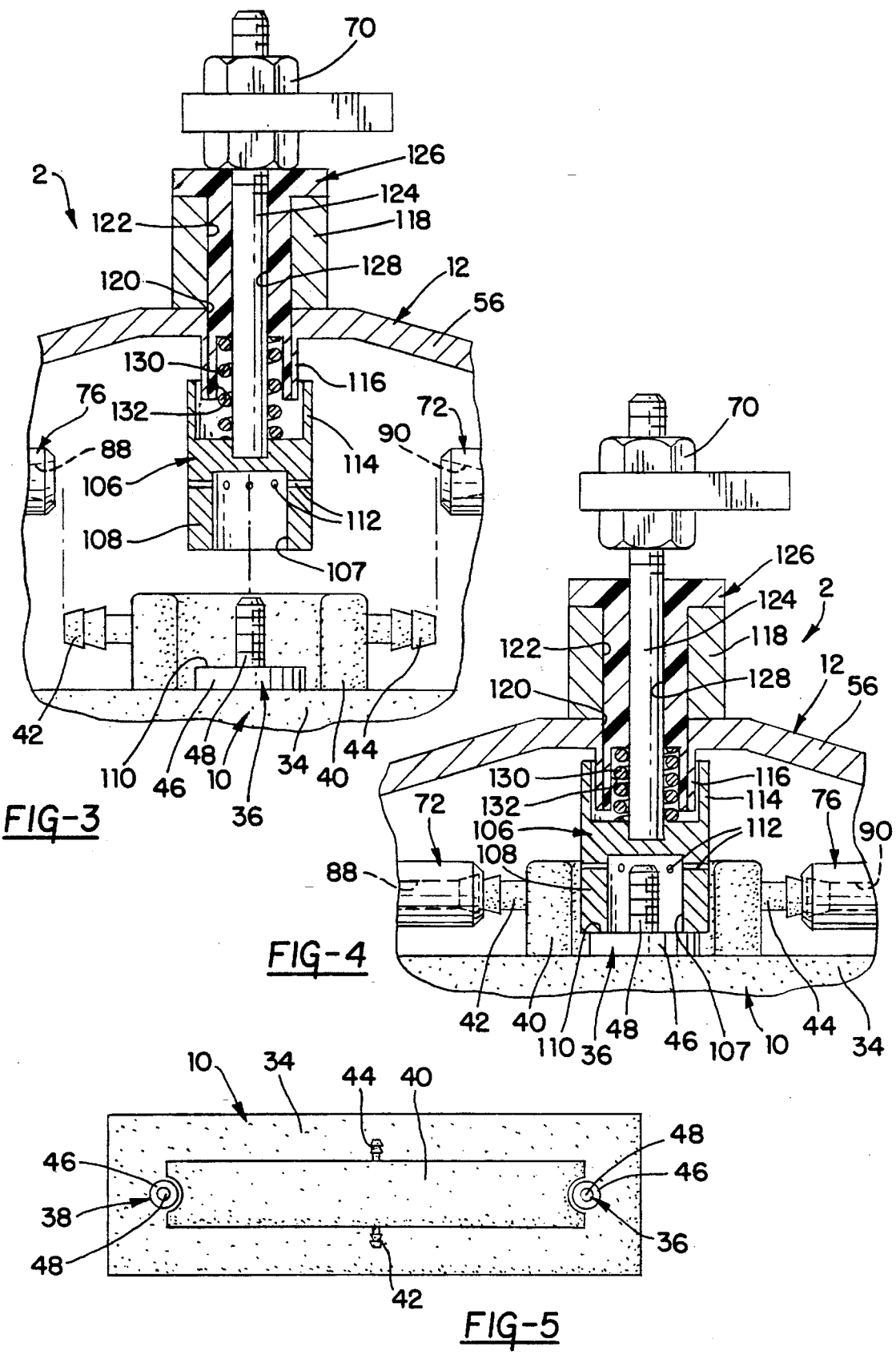

BATTERY LEAK TESTING APPARATUS

This invention relates to apparatus for leak testing hydrogen generating batteries, and more particularly to a simple test and apparatus for sequentially leak testing all batteries on a production line basis.

BACKGROUND OF THE INVENTION

It is known to leak test electric storage batteries prior to shipment. One known technique for such leak testing comprises pressurizing the battery with compressed air through the battery's vent ports followed by measuring the pressure decay over a period of time. If the pressure stays above a specified value, the battery passes. If not, it fails. This technique cannot be used with gas-recombinant-type lead-acid batteries, or other batteries containing a pressure relief check valve in the venting system for maintaining a superambient pressure within the battery and preventing the ingress of ambient air into the battery as the valve prevents pressurization of the battery container.

SUMMARY OF THE INVENTION

The present invention contemplates apparatus for leak testing an hydrogen-generating electric storage battery having (1) a pair of opposite polarity terminals for applying electrical current to the battery, and (2) a vent for exhausting hydrogen from within the battery to the ambient. The testing apparatus comprises (1) an enclosure (e.g., a hood) adapted to overlie and at least partially receive the battery therein, (2) a pair of electrical contacts extending into said enclosure to engage the battery terminals therein [i.e., when the battery is positioned in the enclosure] for the purpose of applying sufficient electrical current to the battery to overcharge the battery; (3) a coupling for sealingly engaging the vent so as to prevent escape of hydrogen from the vent into the enclosure; (4) a gas pressure sensor; (5) a conduit engaging the coupling for routing hydrogen exiting from the vent to the pressure sensor during testing; (6) an exhaust port in the enclosure for extracting samples of the atmosphere for analysis; (7) a vacuum pump in flow communication with the port for extracting samples of the atmosphere in the enclosure via the port; and (8) a sensor communicating with the extracted atmosphere for sensing the presence of hydrogen in the extracted atmosphere.

The enclosure will preferably comprise a hood having a ceiling and an open bottom for receiving the battery into the hood, an elevator for lifting the battery into place within the hood before testing and removing the battery from the hood following testing, and electrical contacts through the ceiling of the hood for automatically engaging the battery terminals when the battery is positioned in the hood. The electrical contacts comprise a contact pad for directly engaging the battery terminal, a rod carrying the contact pad and axially moveable within an opening in an insulator passing through the ceiling and a spring surrounding the rod for biasing the pad downwardly into engagement with the terminal. The contacts are registered with the terminals on the batteries being tested to automatically engage the terminals when the battery is elevated into the hood through the bottom thereof. The rod is surrounded by a sleeve which prevents any hydrogen in the enclosure from escaping the enclosure via the opening through which the rod pass. Most preferably, the leak testing apparatus will include a hydrogen accumulator or separator adjacent the hydrogen sensor for concentrating the hydrogen at the sensor. In the accumulator/separator, the lighter hydrogen gas is separated by gravity from the heavier air, and any hydrogen present rises to the sensor.

The invention relates to a method for leak testing a hydrogen-generating battery having a vent for exhausting the hydrogen to the ambient comprising the steps of plugging the vent sufficiently to permit the hydrogen generated within the battery to build up to a predetermined superambient test pressure therein; positioning the battery in an enclosure; overcharging the battery to generate sufficient hydrogen to raise the pressure within the battery to the predetermined superambient pressure; and analyzing (e.g., by means of a hydrogen sensor) the atmosphere in the enclosure for the presence of hydrogen. The presence of hydrogen in the atmosphere in the enclosure indicates that the battery being tested is a "leaker" and the battery is recycled for resealing. Any hydrogen that might escape the vent is diverted outside the enclosure so as not to contaminant the atmosphere in the enclosure and thereby provide a false reading. In accordance with a preferred embodiment of the invention, the vent is coupled to a pressure sensor which monitors the internal pressure of the battery during hydrogen generation and triggers the sampling and analysis of the enclosure's atmosphere only after the internal pressure of the battery reaches the predetermined superambient test pressure.

DETAILED DESCRIPTION OF CERTAIN SPECIFIC EMBODIMENTS OF THE INVENTION

The invention will better be understood when considered in the light of the following detailed description of certain specific embodiments thereof which is given hereafter in conjunction with the several figures in which.

Figure 1:
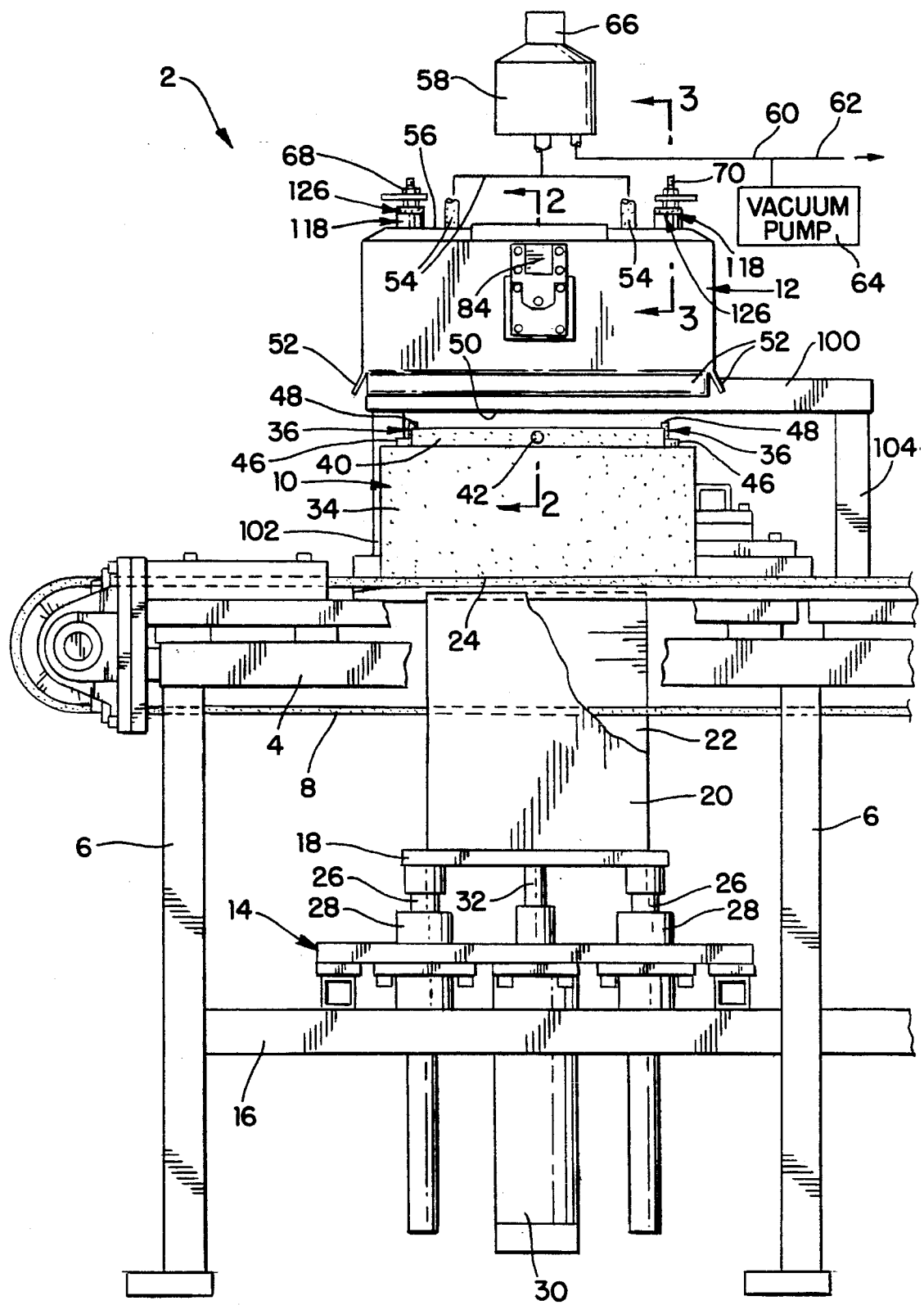
FIG. 1 is a side elevational view of a leak testing apparatus suitable for carrying out the process of with the present invention.
Figure 2:
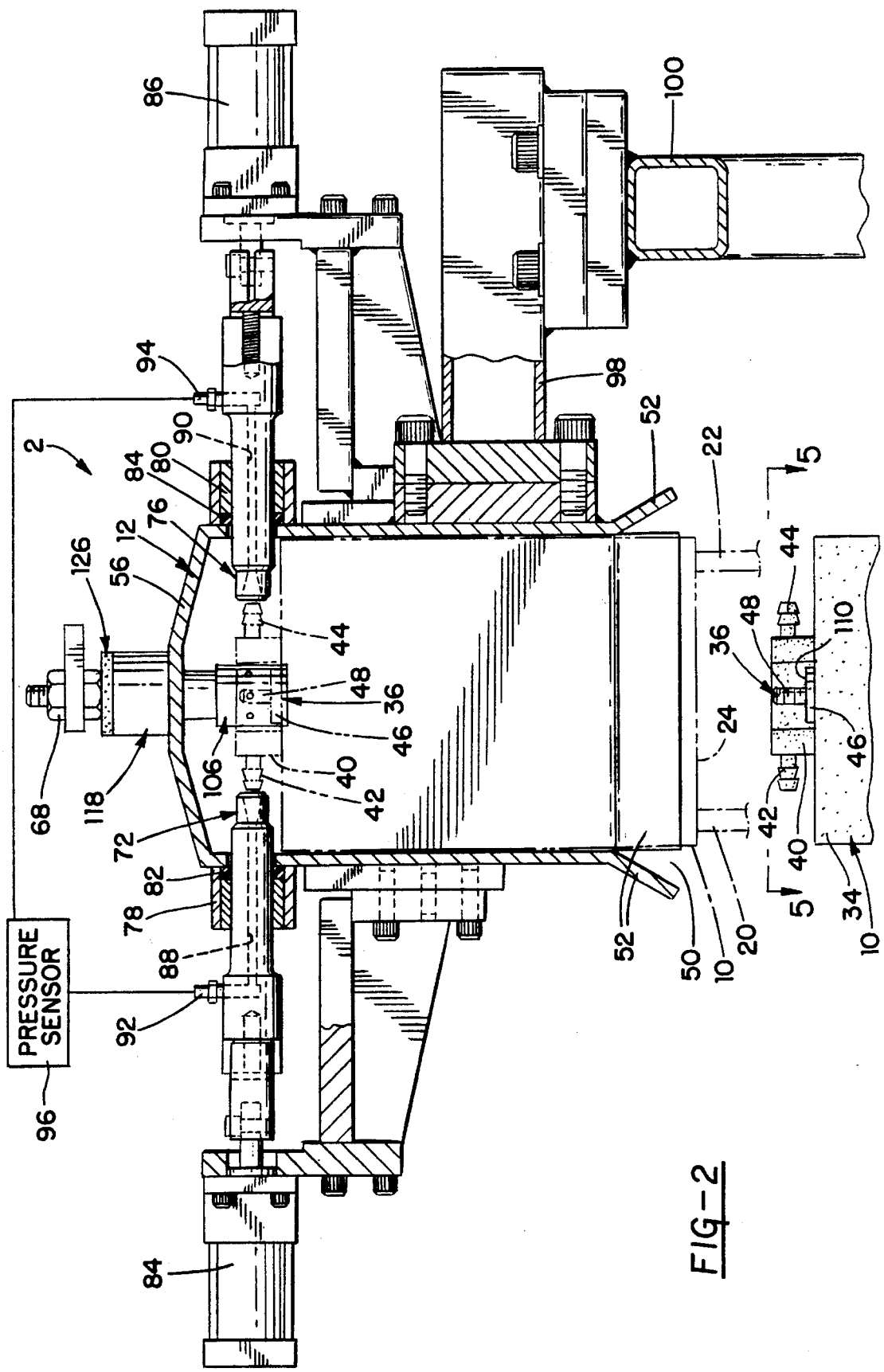
FIG. 2 is a partially sectioned view in the direction 2—2 of FIG. 1.

FIGS. 3 and 4 are views in the direction 3—3 of FIG. 1 just before (FIG. 3) and after (FIG. 4) the battery is fully seated in the hood; and FIG. 5 is a view in the direction 5—5 of FIG. 2.

The several Figures depict a leak testing apparatus 2 having a frame 4 supported by legs 6. The frame 4 carries a conveyor belt 8 for conveying a battery 10 into position beneath a hood/enclosure 12. An elevator mechanism 14 is supported on cross members 16 and comprises a platform 18 which carries a pair of lift arms 20 and 22 which straddle the conveyor belt 8 and engages the bottom 24 of the battery 10 on either side of the belt 8 for lifting the battery 10 up into the hood/enclosure 12. The platform 18 is guided by rods 26 which slide axially in bushings 28, and is actuated by hydraulic cylinder 30 via cylinder rod 32.

The battery 10 is housed in a container 34, and includes a pair of opposite polarity terminals 36 and 38 and a venting manifold 40. The venting manifold 40 collects gases generated from within each cell of a multi-cell battery and directs the gases to vent ports 42 and 44 projecting laterally from either side of the manifold 40. A single vent port may be used in lieu of the two ports shown. The terminals 36 and 38 each include a metal pad or base 46 sealingly engaging the battery container's cover and a threaded stud 48 projecting therefrom for engaging battery cables or the like.

The hood/enclosure 12 is positioned above the battery 10 and is adapted to receive the battery 10 through the open bottom 50 thereof when the elevator 14 is activated. The hood/enclosure 12 is supported above the conveyor line 8 by a bracket 98 carried by a cross member 100 which, in turn, is supported on the frame 4 by legs 102 and 104. Flared out skirts 52 on the lower edge of the hood 12 serve to cam or guide the battery 10 into the open bottom 50 of the enclosure/hood 12. Exhaust pipes 54 withdraw those gases within the hood 12 that immediately underlie the ceiling 56 of the hood 12, and direct them into a hydrogen separator/accumulator 58. The accumulator/separator 58 gravitationally separates any hydrogen from the air such that the lighter hydrogen rises to, and concentrates at, the top of the accumulator 58 while the heavier air is displaced to the bottom of the accumulator 58 and exhausts therefrom via the air exhaust system 60. The exhaust system 60 includes a low level vacuum pump (e.g., a venturi) 64 which is periodically (i.e., ½ second on 3–5 seconds off) energized to aspirate the bottom of the accumulator 58 and induce the flow of air through the exhaust line 60 for discharge to the ambient at exit point 62. A hydrogen sensor 66 is positioned at, or communicates with, the top of the accumulator 58 where any hydrogen that might be present accumulates. Hence, any hydrogen that rises to the top of the accumulator 58 is exposed to the hydrogen sensor. If hydrogen is present, it will be detected by the sensor 66 which in turn signals rejection of the battery as a "leaker".

FIG. 2 shows the battery 10 (shown in phantom) positioned within the enclosure/hood 12 such that the vents 42 and 44 are in axial alignment with couplings 72 and 76 which slide axially to and fro in bushings 78 and 80 respectively. Sealing gaskets 82 and 84 prevent leakage of gas out of the enclosure 12 around the couplings 72 and 76. The couplings 72 and 76 are moved to and fro by hydraulic or pneumatic cylinders 84 and 86, respectively, to sealing engage the vents 42 and 44, respectively, during the test and disengage therefrom at the end of the test. Bores 88 and 90 in the couplings 72 and 76, respectively, communicate the vents 42 and 44 with fittings 92 and 94, respectively, which are connected via appropriate plumbing to a pressure sensor 96 for measuring the internal pressure within the battery 10 during testing. If the pressure sensor 96 is eliminated, the bores 88 and 89 serve to divert any hydrogen exiting the vents 42 and 44 outside of the enclosure/hood 12 so as not to cause any false leakage determinations to be made.

The electrical contacts 68 and 70 extend through the ceiling 56 of the hood 12 for engaging the terminals 36 and 38 of the battery 10 once it is positioned within the hood 12. FIGS. 3 and 4 are sections in the direction 3—3 of FIG. 1 through the electrical contact 70 which automatically engages one of the battery terminals 36 when the battery 10 is positioned in the hood 12. FIG. 3 shows the contact 70 just prior to engagement with the battery terminal 36, and FIG. 4 shows it after the battery 10 is fully seated in the hood 12. The electrical contacts 68 and 70 include an inverted cup-shaped contact element 106 having a depending skirt 108 for engaging the topside 110 of the terminal pad 46. Apertures 112 are provided through the skirt 108 to allow any hydrogen that might leak out of the battery along the shaft of the stud 48 that extends into the battery to escape from within the cup 107 defined by the skirt 108. Hence any $H_2$ gas that might otherwise be trapped in the cup 107 can escape and be sensed by the hydrogen sensor. The cup-like contact 106 also includes an upstanding cylindrical wall or sleeve 114 which is in telescoping relation to a depending wall portion 116 of the ceiling 56. An upstanding tower 118 stands above an opening 120 in the ceiling 56 and, together with the depending wall portion 116, define an elongated opening 122 through which a shaft 124 is positioned and moves axially. The lower end of the shaft 124 engages the contact 106, and is connected to appropriate electrical cables at its upper end for applying electrical current to the contact 106 and the battery 10 during testing. A plastic (e.g., phenolic) insulating bushing 126 has a bore 128 therein for receiving the shaft 124 and permits axial movement of the shaft 124 therein. A compression spring 130 is located in a hollow 132 in the bushing 126 positioned in the opening 122 and serves to bias the electrical contact 106 firmly against the topside 110 of battery terminal pad 46 when the battery 10 is positioned in the enclosure/hood 12. The telescoping relation between the cylindrical wall 114 and the depending ceiling wall 116 prevents leakage of hydrogen therebetween so that hydrogen rising to the top of the enclosure 12 cannot escape the enclosure/hood 12 via the opening 122 or opening 128 through which the shaft 124 reciprocates.

In carrying out the test, the apparatus described above operates as follows. A battery 10 is carried on the conveyor belt 8 into the position shown in FIG. 1 beneath the hood 12. When properly positioned, a limit switch (not shown) is triggered which causes the elevator 14 to rise and lift the battery 10 up into position in the hood 12, as best shown in FIG. 2. When properly positioned with the electrical contacts 68 and 70 engaging the terminals 36 and 38, a limit switch is triggered which energizes the cylinders 86 and 84 to move the couplers 72 and 76 toward each other and into sealing engagement with the vents 42 and 44 respectively. When the couplers 72 and 76 are properly engaged, sufficient electrical current is applied to the battery via the contacts 68 and 70 to cause overcharging thereof and generation of hydrogen within the battery. As hydrogen generation continues, the hydrogen pressure builds in the battery container to a predetermined level which is measured by the pressure gauge 96. When the predetermined pressure level is reached, the vacuum pump 64 is energized to induce flow of gas from the top of the enclosure/hood 12 into the separator/accumulator 58. If there is no hydrogen leakage from the battery, only air will move into the separator/accumulator 58 and the hydrogen sensor 66 will not be activated. Very little vacuum (e.g., about 17 inches of mercury) is needed to induce this flow. The vacuum is applied in pulses which may vary from about ⅒ to ½ second "on" and 3 to 5 seconds "off". Pulsing of the vacuum insures that only air is sucked out of the bottom of the accumulator 58, and allows the $H_2$ to rise therein between pulses. A preferred vacuum pump 64 for this application is a Model M60 Venturi made by the Piab/and Company and operated at a compressed air feed pressure of 40 psi. When hydrogen is present in the enclosure 12, it will rise through the plumbing 54 into the separator/accumulator 58 where it again rises to the top thereof while the vacuum pump 64 is off. The heavier air on the other hand settles to the bottom of the separator/accumulator 58 and is exhausted to the atmosphere via the exhaust system 60. Hence the gas rising to the top of the accumulator 58 is hydrogen enriched and is the gas that is exposed to a hydrogen sensor 66. A preferred such hydrogen sensor is commercially available from the Detcon Corp. as Sensor Model No. FP-005P. Preferably, charging of the battery will continue for a period of about two (2) minutes after the predetermined test pressure has been reached. If no hydrogen is detected by the sensor 66 in that time, the charging current is stopped, the couplers 72 and 76 retracted, the battery 10 dropped out of the enclosure/hood 12 and a new battery moved in place under the hood 12 for repeat of the cycle. As the battery 10 is being withdrawn from the enclosure/hood 12 the inside of the enclosure/hood 12 and accumulator 58 is purged with air such that any hydrogen that might be present therein from a previous "leaker", or from the vents 42 and 44 of a good battery, so as not to contaminant the atmosphere in the enclosure/hood 12 and interfere with the testing of the next battery.

Gas-recombinant, lead-acid batteries include a pressure relief check valve in the vent system to permit a certain predetermined pressure build-up within the battery before the check valve opens to exhaust the gas to the ambient and to prevent ambient air from entering the battery. In conducting tests according to the present invention on such gas-recombinant batteries, it is essential that the internal pressure used to test the battery exceed the opening pressure of the pressure relief valve in the venting system. Typically, such valve regulated vents systems will have relief valve opening pressures between about 1 and about 3 psi. Preferably, the leak testing pressure will be about 2 psi above the opening pressure of the relief valve. Hence for a battery whose relief valve opens at 2 psi the internal pressure used for leak testing the battery will be 4 psi.

It is also possible to test batteries according to the present invention, without monitoring the internal pressure of the battery. In such a case, it need only be necessary to plug the battery's vents to prevent escape of hydrogen gas from the vents 42 and 44, and then allow the pressure to build up within the battery to a predetermined test pressure which can be correlated to the rate at which the battery is being overcharged (i.e., rate at which current is applied to the battery during testing). Similarly, the vent need not be plugged completely, but rather only sufficiently to retard the rate at which hydrogen escapes from the vent and hence permit build up of some degree of internal pressure within the battery. In this alternative, it will then be necessary to shunt or otherwise divert any hydrogen that might be escaping through the vents 42 and 44 outside the enclosure 12 as by, for example, the bores 88 and 90 or by flexible tubing, or the like, connected to the vents 42 and 44 and extending outside the enclosure/hood 12.

While the invention has been disclosed primarily in terms of certain specific embodiments thereof it is not intended to be limited thereto but rather only to the extent set forth hereafter in the claims which follow.

What is claimed is:

1. Apparatus for leak testing an hydrogen-generating, electric storage battery having a pair of opposite polarity terminals for applying electrical current to said battery, and a vent for exhausting said hydrogen from within said battery comprising: an enclosure adapted to receive said battery therein; a pair of electrical contacts extending into said enclosure to engage said terminals in said enclosure for applying sufficient electrical current to said battery to over-charge said battery and generate hydrogen therein; a coupling for sealingly engaging said vent to prevent escape of said hydrogen from said vent into said enclosure; a pressure sensor; a conduit engaging said coupling for routing hydrogen exiting said vent to said pressure sensor; an exhaust port in said enclosure for extracting gases from near the top of said enclosure; a vacuum pump communicating with said port for extracting said gases from said enclosure via said port; and a sensor communicating with the extracted gases for sensing the presence of hydrogen in said atmosphere.

2. Apparatus for leak testing an hydrogen-generating, electric storage battery having a pair of opposite polarity terminals for applying electrical current to said battery, and a vent for exhausting said hydrogen from within said battery comprising: an enclosure defined by a ceiling and a plurality of side walls depending from said ceiling and adapted to receive said battery therein; a pair of electrical contacts extending through said ceiling into said enclosure to automatically engage said terminals in said enclosure for applying sufficient electrical current to said battery to over-charge said battery and generate hydrogen therein during testing; a coupling for sealingly engaging said vent to prevent escape of said hydrogen from said vent into said enclosure; a pressure sensor communicating with said coupling for measuring the pressure developed within said battery; and a hydrogen sensor communicating with said enclosure for sensing the presence of hydrogen in said enclosure.

3. Apparatus according to claim 1 wherein said enclosure comprises a hood having an open bottom for receiving said battery into said hood.

4. Apparatus according to claim 2 including an elevator for lifting said battery into said hood through said open bottom.

5. Apparatus according to claim 2 wherein each said electrical contact comprises a contact pad for engaging a said terminal, a rod carrying said contact pad and axially moveable within an opening in an insulator passing through said ceiling, and a spring surrounding said rod for biasing said pad into engagement with said terminal when said battery is in place in said enclosure.

6. Apparatus according to claim 1 including an hydrogen-accumulator chamber communicating with said enclosure and said hydrogen sensor for concentrating any hydrogen in said enclosure for sensing by said hydrogen sensor.

\* \* \* \* \*